United States Patent [19]

Wildenau

[11] Patent Number: 4,579,907
[45] Date of Patent: Apr. 1, 1986

[54] POLYVINYL CHLORIDE PLASTIC FILM

[75] Inventor: Artur Wildenau, Isernhagen, Fed. Rep. of Germany

[73] Assignee: J. H. Benecke GmbH, Fed. Rep. of Germany

[21] Appl. No.: 646,642

[22] Filed: Aug. 30, 1984

[30] Foreign Application Priority Data

Aug. 30, 1983 [DE] Fed. Rep. of Germany ....... 3331220

[51] Int. Cl.$^4$ .................... C08L 9/06; C08L 27/06; C08L 53/02
[52] U.S. Cl. ...................... 525/96; 525/92; 525/190; 525/211; 525/222; 525/235; 525/239
[58] Field of Search ............. 525/96, 190, 211, 235, 525/239, 92

[56] References Cited

U.S. PATENT DOCUMENTS

| | | | |
|---|---|---|---|
| 2,970,979 | 2/1961 | Meder et al. | 260/45.5 |
| 3,085,082 | 4/1963 | Baer et al. | 525/239 |
| 4,096,204 | 6/1978 | Gergen et al. | 525/96 |
| 4,137,382 | 1/1979 | Vetter | 525/190 |
| 4,161,472 | 7/1979 | Lehr | 525/96 |
| 4,234,703 | 11/1980 | Lindsay | 525/211 |
| 4,423,188 | 12/1983 | Witschard | 525/96 |

FOREIGN PATENT DOCUMENTS

G8220682 11/1982 Fed. Rep. of Germany .

Primary Examiner—Carman J. Seccuro
Attorney, Agent, or Firm—Allegretti, Newitt, Witcoff & McAndrews, Ltd.

[57] ABSTRACT

A plastic film made from polyvinyl chloride homopolymers and/or copolymers that is produced with the use of olefinic unsaturated monomers is disclosed that includes a plasticizing agent and a thermoplastic rubber. The plastic film has high strength, behaves like rubber and has improved aging properties and low temperature properties. External softening is not necessary to obtain elastic properties.

5 Claims, No Drawings

POLYVINYL CHLORIDE PLASTIC FILM

BACKGROUND OF THE INVENTION

1. Field of the Invention

The present invention relates to plastic polymeric films formed from polyvinyl chloride homopolymers and copolymers.

2. Description of Prior Art

West German patent specification No. DE-GMS 8220682 describes a plastic film that has a very low or no plasticizer content. This film consists of two layers, is capable of being deep drawn, and is useful in automobile interiors.

SUMMARY OF THE INVENTION

It is an object of the present invention to create a plastic film formed from polyvinyl chloride homopolymers and/or copolymers and olefinic unsaturated monomers that has improved strength, rubber-like properties, low temperature characteristics and resistance to aging.

It is a specific purpose of the present invention to provide a plastic film having a portion of thermoplastic rubber present in an amount by weight of preferably about 1% to about 10%, most preferably about 3%. The thermoplastic rubber renders it unnecessary to use external plasticizers that, because of their volatility or migrating characteristics, lead to the deterioration of the desirable properties of the plastic, namely low temperature behavior, resistance to aging and flexibility.

DESCRIPTION OF THE PREFERRED EMBODIMENTS

Ethylene propylene terpolymer rubber is useful as the thermoplastic rubber, preferably precipitated out of solution. But styrene butadiene rubber or styrene rubber styrene block polymers can also be used. It is advantageous if the rubber has rubber blocks free of double bonds. In this case it is a styrene ethylene butylene styrene block polymer.

An ethylene vinyl acetate carbon monoxide terpolymer can be used as an effective plasticizing agent. Also, processing aids such as antioxidants and stabilizers can constitute a portion of the overall formula as is well known in the art.

EXAMPLE 1

Starting mixture: polyvinyl chloride homopolymer 77.6% by weight; ethylene vinyl acetate carbon monoxide terpolymer 19.4% by weight; and processing aids 3.0% by weight.

This mixture was calendared for 10 minutes at 110° C. 3.0% by weight of cold ethylene propylene terpolymer rubber was added to the mixture. From this, at 165° C. with a working time of 7 minutes, plastic films were produced having the following mechanical values:

|  | Measurement after 4 hours | Measurement after 24 hours |
| --- | --- | --- |
| Tensile strength (N) | 350 | 346 |
| Breaking elongation (mm)[1] | 130 | 134 |
| Breaking elongation (%) | 220 | 235 |

[1]The point of the curve in the tension/elongation diagram where breaking takes place.

EXAMPLE 2

The same starting mixture was used as in Example 1, but instead of the ethylene propylene terpolymer rubber, 3% by weight styrene butadiene rubber was added. In this case the following mechanical values were obtained:

|  | Measurement after 4 hours | Measurement after 24 hours |
| --- | --- | --- |
| Tensile strength (N) | 320 | 320 |
| Breaking elongation (mm) | 120 | 120 |
| Breaking elongation (%) | 200 | 196 |

EXAMPLE 3

A basic starting mixture as in Examples 1 and 2 was used, but 3% by weight of styrene rubber styrene block polymer was added, giving the following values:

|  | Measurement after 4 hours | Measurement after 24 hours |
| --- | --- | --- |
| Tensile strength (N) | 390 | 354 |
| Breaking elongation (mm) | 136 | 135 |
| Breaking elongation (%) | 240 | 239 |

I hereby claim as my invention:

1. A plastic film comprising a polyvinyl chloride homopolymer or copolymer, an ethylene-vinyl acetate-carbonmonoxide terpolymer, and a thermoplastic rubber selected from the group consisting of ethylene-propylene rubbers, styrene-butadiene rubbers and styrene-rubber-styrene block polymers.

2. The plastic film of claim 1, wherein the thermoplastic rubber is present in an amount of about 1 to about 10% by weight.

3. The plastic film of claim 1, wherein the thermoplastic rubber is a styrene ethylene butylene styrene block polymer.

4. The platic film of claim 1, additionally comprising antioxidants and stabilizers.

5. The plastic film of claim 2, wherein the thermoplastic rubber is present in an amount of about 3% by weight.

* * * * *